Feb. 8, 1966 R. R. McLAREN ETAL 3,234,361
APPARATUS FOR MEASURING MOVEMENT OF A CYCLIC WAVE PATTERN
Filed Aug. 30, 1962 3 Sheets-Sheet 1

Inventors
R. R. McLAREN
A. T. SHEPHERD
D. F. WALKER
BY Cameron, Kerkam + Sutton Attorneys Feb. 8, 1966     R. R. McLAREN ETAL     3,234,361
APPARATUS FOR MEASURING MOVEMENT OF A CYCLIC WAVE PATTERN
Filed Aug. 30, 1962     3 Sheets-Sheet 2
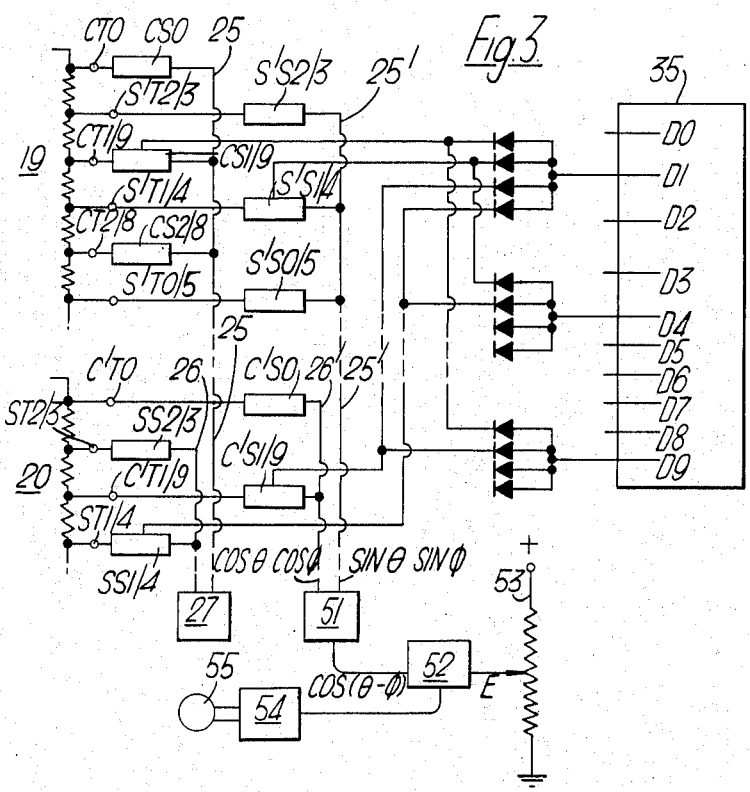
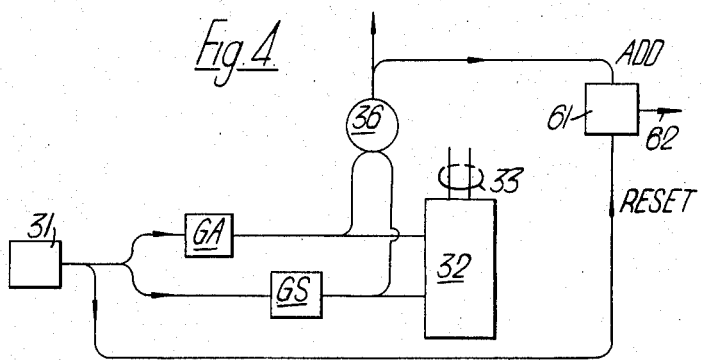
Inventors
R. R. McLAREN
A. T. SHEPHERD
D. F. WALKER
BY Cameron, Kerkam & Sutton Attorneys Inventors
R. R. McLAREN
A. T. SHEPHERD
D. F. WALKER
BY Cameron, Kerkam & Sutton Attorneys United States Patent Office 3,234,361
Patented Feb. 8, 1966

3,234,361
APPARATUS FOR MEASURING MOVEMENT OF A CYCLIC WAVE PATTERN
Ronald Robert McLaren and Alexander Turnbull Shepherd, Edinburgh, and Donald Ferguson Walker, Barnton, Midlothian, Scotland, assignors to Ferranti Limited, Hollinwood, England, a company of the United Kingdom of Great Britain and Northern Ireland
Filed Aug. 30, 1962, Ser. No. 220,463
Claims priority, application Great Britain, Sept. 7, 1961, 32,084/61
11 Claims. (Cl. 235—92)

This invention relates to measuring apparatus for determining the extent and sense of the movement of a cyclic wave pattern of approximately sinusoidal waveform in one or other of two opposite directions with respect to a reference structure.

The pattern may itself be moving in proportion to the movement of some object, such as a measuring probe or a part of a machine tool, so that by measuring the pattern movement that of the object may be determined.

It is known to effect such measurement by summating algebraically the pulses derived indirectly from two or more spaced detecting devices or pick-offs responsive to the pattern, the pulses having one or other sense, or being in one or other of two channels, according to the direction of the movement, and representing by their total number the extent of it.

Under certain unfavourable conditions of operation miscounting of the pulses may occur. For example, over a transient period the movement to be measured may be so rapid that the pulses representing it arrive too quickly for the counter to accept them, with the result that some of them are irrecoverably lost. Vibrational movements may have the same effect. Where a sudden reversal of the movement occurs, pulses may be lost because the counter is unable to change from its Add to its Subtract condition quickly enough. Pulses may also be lost because of a momentary circuit failure of the counter, such as a multivibrator hanging fire.

An object of the present invention is to provide measuring apparatus for the purpose stated which effects the measurement by a pulse count and which is to some extent, at least, free from errors due to miscounting of pulses, in particular under the unfavourable conditions referred to.

In accordance with the present invention, measuring apparatus for determining the extent and sense of the movement of a cyclic wave pattern of approximately sinusoidal waveform in one or other of two opposite directions with respect to a reference structure includes at least two detecting devices arranged to respond electrically to the conditions of the pattern at a like number of positions, each to each, fixed with respect to the reference structure, a tapped cosine potentiometer and a tapped sine potentiometer, stages for energising said potentiometers by signals derived from the detecting devices, said conditions of the pattern being so out of phase with one another and said stages being so arranged that said signals are proportional at any given moment to the sine and cosine, respectively, of an angle representing a condition of the pattern at that moment, switching means to allow the tappings to be effectively engaged, a bi-directional switching counter arranged to be actuated by electrical pulses so long as the difference between the output voltages from the engaged tappings of the respective potentiometers exceeds a predetermined value, and when so actuated is arranged to cause the tappings to be effectively traversed in the direction for nulling said difference.

The counter may have digit stages each of which is uniquely associated with one angle as represented by one tapping on each potentiometer and each of which stages includes an output point arranged to be distinctively energised with respect to the output points of the other digit stages whenever the counter holds that digit, there being provided control means so connecting said output points to the switching means as to allow each output point when distinctively energised to cause the effective engagement of only the associated tapping of each potentiometer.

The invention will now be described by way of example as applied to a machine tool, the pattern being arranged to move with the worktable relative to the reference structure constituted by the framework of the tool.

In the accompanying drawings,

FIGURE 1 is a schematic diagram of one embodiment of the invention,

FIGURE 2 is a circuit diagram of a stage shown schematically in FIGURE 1, and

FIGURES 3 to 6 illustrate parts of further embodiments.

Figure 5:
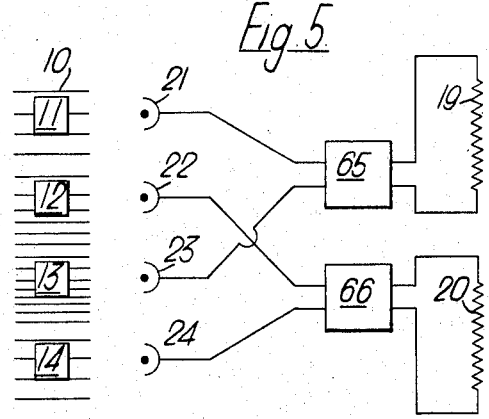

In FIG. 1 a pattern of sinusoidal waveform, which may be an optical pattern similar to that described with reference to FIG. 2 of U.S. Patent No. 2,886,717, is represented at 10. The pattern is arranged to move with the worktable (not shown) past two positions 11 and 12 which are fixed with respect to the framework of the tool. The conditions of the pattern at these two positions are 90° out of phase with one another—that is, they are in quadrature—and so may be represented by the expressions $\sin \theta$ and $\cos \theta$, where $\theta$ itself represents the angular position of the pattern with respect to some datum point on the framework.

To respond electrically to these conditions of the pattern respectively there are provided two detecting devices in the shape of photocells 21 and 22, which are also fixed with respect to the framework. Because of the phase relationship above mentioned, the output signals from the cells as the pattern moves past them are in quadrature, proportional to $\sin \theta$ and $\cos \theta$ respectively.

The signal from cell 21 is applied by way of an amplifier stage 15 to a phase-splitter stage 17 the balanced counter-phase outputs of which are applied to energise a cosine potentiometer 19. Similarly the signal from cell 22 is applied by way of an amplifier stage 16 and a phase-splitter stage 18 to energise a sine potentiometer 20. It will be understood that by "cosine potentiometer" is means a potentiometer so tapped to represent angular values that the voltage output from any engaged tap represents the cosine of the angle represented by that tap. Similarly with a sine potentiometer. In general, sine and cosine potentiometers may be alike as regards the resistance winding and the taps and differ only as regards the angular values ascribed to the taps.

Cosine potentiometer 19 is tapped at six points having equal angular spacings of 36° so that taps cover the range 0°–180°. Advantage is taken of the fact that a cosine potentiometer track from 0° to 180° is the same as that 180° to 360° to use these taps to represent the latter range also, the six taps covering the full range of ten angular positions 0°, 36°, 72° . . . 324°. As will be described later, these taps are selectable on dependence in the ten digits 0 to 9 respectively. The end taps are therefore designated CT(cosine tap)0 and CT5, as they only represent the angles 0° (or 360°) and 180° respectively, and the other taps are designated CT1/9 (representing the angles 36° and 324°), CT2/8(72° and 288°), and so on.

The taps are individually connected by switching means in the form of switches CS(cosine switch)0, CS1/9, as the case may be, to a common output load 25 individual to that potentiometer.

Potentiometer 20 is tapped in a similar manner at 36° spacings. As, however, this is a sine potentiometer the the 360° range is covered by five taps ST(sine tap)0/5 (representing the angles 0° and 180°), ST1/4(36° and 144°), ST2/3(72° and 108°), ST6/9(216° and 324°), and ST7/8(252° and 288°), with tap ST0/5 in the centre and the others located relatively to it as shown. These taps are individually connected by switches SS(sine switch)0/5, SS1/4, etc., as the case may be, to a common output lead 26 individual to potentiometer 20.

Switches CS and SS may conveniently be regarded for the present as of a conventional electromechanical kind and are so dipicted in FIG. 1, with switches CS1/9 and SS1/4 shown closed. In practice it is usually preferable for them to be of some electronic form, as described later.

Leads 25 and 26 are connected to the input of a difference amplifier 27 the output of which is applied as an error signal to control Add and Subtract gates GA and GS connected in parallel to the output of a pulse source 31. The output sides of the gates are applied to control a two-state device 32 the output of which is in turn applied over leads 33 to the Add/Subtract control rails of a main counter 34 and phase-locked switching counter 35. The outputs from the gates are also connected to the input side of an OR gate 36 the output of which is applied as the actuating signal to both the counters.

Counter 34 is a multi-decade bi-directional counter arranged to indicate the algebraic sum of the pulses supplied to counter 35 and hence the position of the worktable.

Counter 35 is a single-decade bi-directional counter of electronic form having ten output points in the form of leads D0 to D9 representing the respective digits. Each output lead is uniquely associated with one angle as represented by one tapping on each potentiometer. Hence these leads are so connected, by way of control means which will be described later and which are indicated in FIGURE 1 by the broken lines 37, to control switches CS and SS and are so distinctively energised with respect to one another that when the counter holds digit 0, and in consequence the corresponding output lead D0 is distinctively energised, only switches CS0 and SS0/5 are closed, thereby effectively engaging the corresponding taps by connecting them to leads 25 and 26 respectively; when the counter holds digit 1, only switches CS1/9 and SS1/4 are closed, and so on. Hence a stepping cycle of switch 35 from digit 0 to digit 9 and back to digit 0 direct causes the taps to be effectively traversed through 360° from 0° back to 0°, keeping equal, at some value $\phi$, say, the angles represented by the taps engaged at any one moment in the respective potentiometers. The output over lead 25 is thus always proportional to the product of cos $\phi$ and the voltage energising potentiometer 19; and the output over lead 26 to the product of sin $\phi$ and the voltage energising potentiometer 20.

With the pattern at the angle $\theta$ from datum, then, potentiometer 19 is energised in proportion to sin $\theta$ and so supplies over lead 25 a voltage proportional to the product of sin $\theta$ and cos $\phi$. Similarly potentiometer 20 supplies over lead 26 a voltage proportional to the product of cos $\theta$ and sin $\phi$. Hence the output from difference amplifier 27 is an error signal dependent on the difference between these voltages—that is, dependent on $$(\sin \theta \times \cos \phi) - (\cos \theta \times \sin \phi) = \sin (\theta - \phi)$$

For small angular differences—up to 20°, say—this last expression reduces to $(\theta - \phi)$.

The sense and magnitude of this error signal output from amplifier 27 are such as to cause gate GA to be opened when $\phi$ is less than $\theta$ to the extent of at least half the angular increment between taps—that is to say, when $\theta$ has become more than 18° greater than $\phi$—but to open gate GS instead when $\theta$ has become less than $\phi$ to that extent. As will be appreciated later, this sense discrimination is such as to cause the counter to be actuated in the sense for traversing the tappings in the direction for nulling the error signal.

In operation, assume to begin with that the worktable is in its starting position with $\theta$ at its pattern datum value 0°. Assume also that counter 35 is engaging its digit 0 and that accordingly only switches CS0 and SS0/5 are closed, and that each decade of counter 34 is at digit 0, too. With those switches closed the angle $\phi$ represented by the corresponding taps is 0°. Hence $\theta = \phi$, there is no error signal output from amplifier 27, gates GA and GS are both closed, and none of the pulses being generated at a steady rate at source 31 are passing to the counters.

Suppose now the table begins to move forward, thereby correspondingly shifting the pattern and increasing the value of $\theta$. With counter 35 so far as yet inactive, switches CS0 and SS0/5 remain closed, holding $\phi$ at 0. Amplifier 27 therefore begins to develop an error signal, which however is not immediately strong enough to influence either of the gates. As soon as $\theta$ has exceeded 18° the error signal is sufficient to open one of the gates, the gate concerned being GA as $\phi$ is less than $\theta$. The next pulse generated by source 31 passes through the gate. This pulse has two effects: it triggers device 32 to its Add state (if not already in it) so as to set both counters to their forward counting condition, and it passes to the counters through gate 36 to step each one forward by one digit.

The effect of thus stepping counter 35 is to open switches CS0 and SS0/5 and close switches CS1/9 and SS1/4, thereby increasing $\phi$ to 36° in each potentiometer to bring it back towards equality with $\theta$. This tends to null the error signal by reducing the angular difference to less than 18° so that an error signal large enough to keep a gate open is no longer developed, and pulses cease to be passed to the counters until $\theta$ has again gained a lead of over 18°.

Hence the drift of the pattern is accompanied by a corresponding traversing of the potentiometer taps by counter 35 such as maintain the stepwise-changing $\phi$ within half an increment of the steadily changing $\theta$. The pulses thus passed to counter 34 are added there to give by their total an indication of the table's position.

Should the table move backwards from some forward position, $\theta$ becomes less than $\phi$. The effect of this is that the gate opened by the error signal when the angular difference is large enough is gate GS, which triggers device 32 to set the counters to their Subtract condition. Counter 35 now steps in the reverse direction, lowering the value of $\phi$ in close correspondence with $\theta$. In counter 34 the pulses are subtracted from the count to indicate the reduced distance of the table from its datum starting position.

Hence the counter is pulse-actuated in a sense dependent on the sense of the difference between the voltages on leads 25 and 26 from the engaged taps whenever that difference exceeds the predetermined value represented by an angular difference of 18° between the condition of the pattern and the setting of the potentiometers.

Should the table cease to move, the apparatus continuous to operate until $\phi$ has been brought close enough to $\theta$ for the error signal to be no longer large enough to operate either of gates GA or GS. The pulses then cease to be passed to the counters, the total of those in counter 34 indicating the then stationary position of the table.

Should there occur a short transient movement of the table which is faster than the limiting response speed of the apparatus, as determined by the repetition rate of the pulses supplied by source 31, no permanent error results so long as $\phi$ is not thereby caused to lag behind $\theta$ by more than half a cycle of the pattern, for on the cessation of the transient condition the apparatus operates to catch up without any pulses being lost. What happens if $\phi$ should lag half a cycle behind $\theta$, and how such misoperation is guarded against, is described below. The apparatus similarly operates to catch up should there be any momentary failure of either of the counters, such as due to a multivibrator hanging fire. This characteristic permits the main counter to be arrested momentarily for, say, an automatic read-out, whilst allowing the measuring or control process as a whole to continue uninterrupted.

Each pulse in the counters thus represents one tenth of that table movement which is represented by one cycle of the pattern.

A further advantage of the invention is that a spurious pulse arriving at the counters from the photocells, or even direct from some local source of interference, only causes the counters to be in error momentarily, for on the cessation of the pulse the counters are automatically brought back to their true phase relationship to the cell outputs.

It may be necessary to insert a delay stage, as indicated at 38 by broken lines, between OR gate 36 and the counters to ensure that on any reversal of the direction of movement of the pattern the ensuing pulse has time to operate device 32 to switch each counter to its other condition before that pulse is applied to the counters.

As already mentioned, switches CS and SS are preferably of electronic form. A suitable arrangement of such a switch—taking switch CS1/9 as an example—is shown in FIG. 2. The corresponding tap CT1/9 is connected to lead 25 by way of two opposite points of a rectifier bridge network 41 the other two opposite points of which respectively connected to the emitter and collector electrodes of a switching transistor 42. The base of transistor 42 is connected through a resistor 43 to the collector electrode of another transistor 44. This electrode is also connected through a resistor 45 to a source of negative potential, the emitter being connected to a source of positive potential. The base is connected to a tap on a resistor 46 which is in series with a resistor 47, in that order, between a positive and a negative source of potential. The digit 1 stage and digit 9 stage outputs from counter 35 are connected to the common point of resistors 46 and 47 by way of diodes 48 and 49 respectively (to prevent interaction between the switches), each diode being poled to conduct when the digit output rises positively to indicate the presence of a digit.

The bridge allows for the fact that the potential of tap CT1/9, as determined indirectly by the output from cell 21, may be above or below the potential of lead 25, as determined by the input bias of amplifier 27. When transistor 42 is conducting, the potential of tap CT1/9 is applied through the bridge to lead 25, the tap being thereby effectively engaged, whatever the sense of the potential difference between them. When the transistor is cut off, the path between tap CT1/9 and lead 25 is effectively broken. The potentials applied to the base of transistor 42 from counter 35 by way of transistor 44 are such that only when the counter holds either digit 1 or digit 9 is the transistor conducting and the potential of tap CT1/9 applied to lead 25. Transistor 44 serves to modify the D.C. excursions of the digit outputs from counter 35, both in sense and extent, so as to ensure that transistor 42 is fully switched by those excursions.

A connection is made from the digit 1 stage output of counter 35 by way of another diode $48^1$ to the switch SS1/4 and from the digit 9 stage output by way of a diode $40^1$ to the switch SS6/9, each of these switches being of similar kind to switches S1/9 just described.

Connections by way of diodes (not shown) are made from all the other digit outputs of counter 35 to the appropriate ones of the other switches.

Hence as the counter steps from digit to digit the tappings are effectively traversed as the respective transistors are rendered conducting.

It is usually preferable to traverse the tappings by means of a counter which is independent of the main counter even when, as described above, the main counter would divide the basic measuring unit into the requisite number of steps, for the traversing counter has of necessity to be phase-locked to the pattern and so cannot be reset to zero unless the pattern is restored to a datum position which is always the same. The use of an independent phase-locked counter allows the main counter to be reset to zero when the pattern has been brought to any arbitrary datum position that is convenient.

It is desirable for the pattern to be illuminated at a steady intensity, otherwise the fluctuations of the photocell outputs may be such as to set up corresponding fluctuations of the error signal sufficient to operate gates GA and GS undesirably and so pass a wrong number of pulses to the counters. To secure sufficient constancy of light intensity the arrangement of FIG. 3 may be adopted. A further sine potentiometer is provided by giving cosine potentiometer 19 (only a part of which is shown) and additional five taps $S^1T0/5$, $S^1T1/4$, etc., in accordance with a sine law. Similarly sine potentiometer 20 is provided with an additional six taps $C^1T0$, $C^1T1/9$, etc., in accordance with a cosine law to provide in effect a further cosine potentiometer. These taps are respectively connected by further switches $S^1S0/5$, $S^1S1/4$, etc., to an output lead $25^1$, and by further switches $C^1S0$, $C^1S1/9$, etc., to an output lead $26^1$. The switches are of the kind described with reference to FIG. 2 and are controlled by further control means in a similar manner by the digit outputs of counter 35, acting again by way of diodes to prevent unwanted inter-connections between the switches. Thus the digit 1 output is applied with the digit 9 output to control switches SC/1 and $C^1S1/9$, and with the digit 4 output to control switches SS1/4 and $S^1S1/4$. Lead $25^1$ is thus energised in proportion to $E \sin \theta \sin \phi$, and lead $26^1$ in proportion to $E \cos \theta \cos \phi$, where E is the amplitude of the signals energising the potentiometers, itself dependent on the brightness of the light source.

Leads $25^1$ and $26^1$ are connected to the inputs of a summing amplifier stage 51 the voltage output of which is compared in a comparator 52 with a predetermined reference voltage derived from an adjustable tapping on a potentiometer 53 energised at a fixed voltage. The output from the comparator, which is dependent in sense and value on the difference between the two voltages applied to it, is applied by way of a regulator 54 to control the brightness of lamp 55 which illumines the pattern.

In operation, the output from amplifier 51 is proportional to $E(\sin \phi \sin \theta + \cos \theta \cos \phi) = E \cos (\theta - \phi) = E$ approximately, when, as is usually the case, $\theta$ is approximately equal to $\phi$. The slider of potentiometer 53 is adjusted so that when E has the desired value corresponding to the desired intensity of the light from lamp 55 the output from the comparator is zero. Any departure of the light intensity from the desired value results in the development by comparator 53 of an error signal of appropriate sense which adjusts regulator 54 to restore the lamp to the desired brightness.

In the embodiments so far described, if $\phi$ should lag on $\theta$, or lead $\theta$, by more than half a cycle of the pattern the appartus will start operating in reverse, pulses being subtracted instead of added, or vice versa, as the case may be. This is unlikely to happen unless a fault has developed. To give a warning or other response indication of such a condition the apparatus of FIG. 1 may be given auxiliary equipment as shown in FIG. 4. This equipment relies on the fact that such a fault condition is evidenced by the passing of too many successive pulses—more than three, say—from the source 31 to the counters. The output pulses from OR gate 36 are therefore also applied as additive inputs to an auxilary counter 61 of the two-stage binary kind. To this stage are applied direct every pulse from source 31 in such manner as to reset it to a datum number, conveniently zero, whenever there is no synchronous pulse from gate 36. The "overflow" output or carry signal from digit 3 to digit 4 of the stage is applied over a lead 62 to the response equipment.

Figure 6:
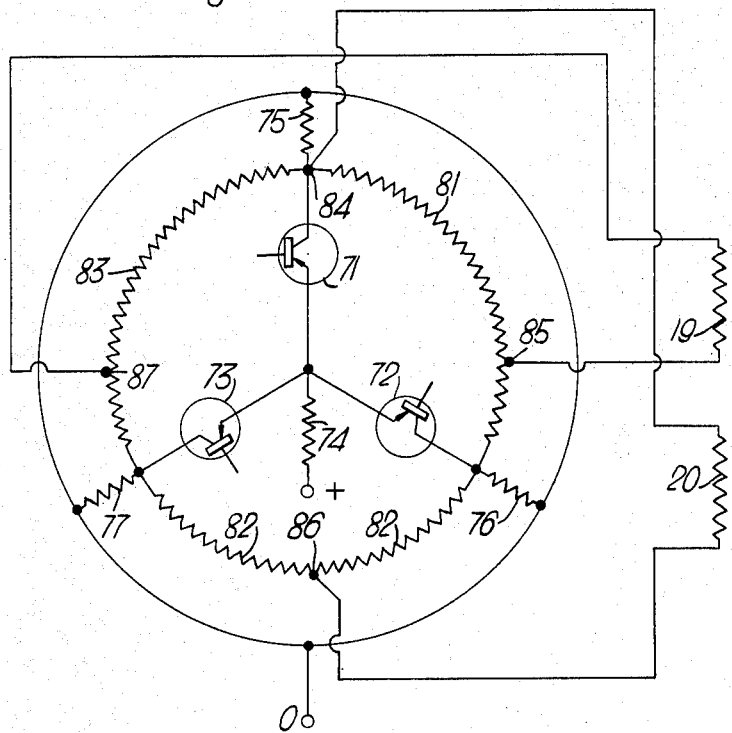

In operation, counter 61 will only develop a carry signal and give warning on receipt of a fourth successive pulse from gate 36. Under normal operating conditions where $\phi$ is maintained close to $\theta$, gates GA and GS will be closed against the pulse from source 31 before as many as four of them have been passed. The first blocked pulse from the source, reaching counter 61 without there being a synchronous pulse from gate 36 on the additive input, will restore the stage to zero. Hence as long as there are never as many as four successive pulses passed to the counter, stage 61 will never overflow to give the fault warning.

Where necessary to stabilise the apparatus against shifts of circuit parameters, four photocells may be used instead of two. As shown in FIG. 5, the four cells 21 to 24 are arranged to respond to the conditions of pattern 10 at positions 11 to 14, each to each, spaced 90° apart. The outputs from cells 21 and 23, which accordingly are in counterphase, are applied to potentiometer 19 by way of a difference amplifier 65, which may take the form of two transistors, one for each cell, sharing a common emitter load. The counterphase outputs of cells 22 and 24 are applied to potentiometer 20 by way of a like difference amplifier 66. The operation is similar to that of the apparatus described with reference to FIG. 1 of our patent specification No. 810,478, now Patent No. 3,024,395.

Where it is preferred to use three photocells, responsive to the condition of the pattern at 120° spacings as described in the co-pending patent application of Alexander Turnbull Shepherd et al., Serial No. 393,053, filed August 31, 1964, as a continuation of Serial No. 134,333, filed August 28, 1961, now abandoned, and again effect stabilisation, the quadrature supply to energise potentiometers 19 and 20 may be derived as shown in FIG. 6.

In this arrangement three transistors 71 to 73 share a common emitter load 74. The collector electrodes are connected to earth (zero potential) by resistive loads 75 to 77 respectively, and are interconnected in ring fashion by resistors 81 to 83, forming a phase-converting stage. The three cells (not shown) are connected to the bases of the three transistors, each to each, each by way of an amplifying stage if necessary. The quadrature outputs are derived from tappings suitably located around the ring of resistors 81 to 83. The ring acts as a delta network load on the three-phase supply from the cells, and so represents all phase angles starting from 0° at, say, a tap 84, where the collector of transistor 71 is connected to the ring, through 90° at a tap 85, three-quarters of the way along resistor 81, 180° at tap 86 mid-way along resistor 82 and hence diametrically opposite tap 84, and 270° at tap 87 on resistor 83 diametrically opposite tap 85. Cosine potentiometer 19 is energised from tap 84 and 86, and sine potentiometer 20 from tap 85 and 87.

The required stabilisation against shifts of circuit parameter is attained by the use of the common emitter load resistor 74, forming with the three transistors a stabilising stage as described in the aforementioned co-pending patent application Serial No. 393,053.

Similar phase conversion networks may be used to derive the quadrature supply from the cells where more than four detecting devices are used.

It is not essential for the potentiometer supply to be accurately in quadrature, though it is usually preferable for it to be so; a phase difference anywhere in the range 45° to 135° has been found to give acceptable results.

Nor is it essential for the cyclic pattern to be accurately sinusoidal, though here again that form gives the best results.

It will be appreciated that, among various details which may be modified within the scope of the invention, the counters may take other forms than those described. For example, instead of having Add and Subtract rails which are pre-conditioned to handle appropriately each input pulse, which, whether for adding or subtracting, is always applied to the same electrode, the counters may be of the kind in which the pulses are applied to one or other of two input electrodes depending on whether they are to be added or subtracted. In that case the outputs from gates GA and GS may be applied direct to each counter, device 32 being omitted but an OR gate corresponding to gate 36 being retained to drive from both trains of pulses a single train for application to counter 61, FIG. 4.

The pattern need not be an optical pattern; it may for example be a magnetic pattern, the detecting devices being electromagnetic transducers rather than photocells.

The invention is of course not limited to machine tool measurements but may be applied to a wide variety of devices such as measuring probes, gauges, extensometers, etc., where a highly accurate measurement of movement is required.

What we claim is:

1. Measuring apparatus for determining the extent and sense of the movement of a cyclic wave pattern of approximately sinusoidal waveform in one or other of two opposite directions with respect to a reference structure including at least two detecting devices arranged to respond electrically to the conditions of the pattern at a like number of positions, each to each, fixed with respect to the reference structure, a tapped cosine potentiometer and a tapped sine potentiometer, stages for energising said potentiometers by signals derived from the detecting devices, said conditions of the pattern being so out of phase with one another and said stages being so arranged that said signals are proportional at all given moment to the sine and cosine, respectively, of an angle representing a condition of the pattern at that moment, switching means to allow the tappings on each potentiometer to be effectively engaged, a bi-directional switching counter arranged to be actuated by electrical pulses so long as the difference between the output voltages from the engaged tappings of the respective potentiometers exceeds a predetermined value, and when so actuated is arranged to cause the tappings to be effectively traversed in the direction for nulling said difference.

2. Apparatus as claimed in claim 1 wherein the counter has digit stages each of which is uniquely associated with one angle as represented by one tapping on each potentiometer and each of which stages includes an output point arranged to be distinctively energised with respect to the output points of the other digit stages whenever the counter holds that digit, there being provided control means so connecting said output points to the switching means as to allow each output point when distinctively energised to cause the effective engagement of only the associated tapping of each potentiometer.

3. Appartaus as claimed in claim 1 where the number of detecting devices is two, wherein the corresponding conditions of the pattern are 90 electrical degrees out of phase with one another, and the signals from each device are applied to the appropriate potentiometer by way of a phase-splitter stage.

4. Apparatus as claimed in claim 1 where the number of detecting devices is three, wherein the corresponding conditions of the pattern are 120 electrical degrees out of phase with one another, and the signals from the devices are applied to the potentiometers by way of a stabilising stage and a phase-conversion network.

5. Apparatus as claimed in claim 1 where the number of detecting devices in four, wherein the corresponding conditions of the pattern are 90 electrical degrees out of phase with one another, and the signal from each pair of devices responsive to counterphase conditions of the pattern are applied to the appropriate potentiometer by way of a stabilising difference stage.

6. Apparatus as claimed in claim 1 wherein said switching means includes for each tapping a transistor individual to it and controlled over connections from the appropriate digit output point or, where the tapping represents more than one angle, the appropriate digit output points.

7. Apparatus as claimed in claim 6 wherein the arrangement is such that when a digit output point is distinctively energised the transistors controlled by it are rendered conductive, thereby effectively connecting the corresponding tapping of each potentiometer to a common output lead individual to that potentiometer.

8. Apparatus as claimed in claim 1 wherein said pulses are derived from a pulse source which supplies them at a steady rate to an Add and a Subtract gate of which the gate appropriate for the nulling of said difference is operated to allow pulses to pass to the counter to be added or subtracted, as the case may be, as long as said difference exceeds the predetermined value.

9. Apparatus as claimed in claim 8 wherein to supply a warning signal whenever more than a predetermined number of successive pulses from said source are passed to the swtiching counter there is provided an auxiliary counter arranged to receive all the pulses passed to the switching counter, to receive direct all the pulses supplied by the source, and to be reset to a datum number each time one of the last-mentioned pulses is not received in coincidence with a pulse passed to the switching counter, the auxiliary counter being further arranged to supply said signal when the counter exceeds said number above the datum number.

10. Apparatus as claimed in claim 2 wherein the pattern is an optical pattern irradiated by a light source and for maintaining a substantially constant intensity of the light there is provided a further sine and a further cosine potentiometer tapped at angular intervals and arranged to be energised by signals from the detecting devices proportional at any given moment to the sine and to the cosine, respectively, of said angle of the pattern, further switching means to allow the tapping on each further potentiometer to be effectively engaged, further control means whereby the switching counter actuates the further switching means so that the tappings respectively engaged on the two further potentiometers at any given moment represent the angle associated with the digit point then effectively energised, a summing stage for deriving a voltage dependent on the sum of the output voltages from the engaged tappings of the further potentiometers, and means for controlling the brightness of said source in dependence on the difference between the voltage so derived and a predetermined reference voltage.

11. Apparatus as claimed in claim 1 wherein a further bi-directional counter is provided to indicate the algebraic sum of the pulses passed to the switching counter.

References Cited by the Examiner
UNITED STATES PATENTS

| | | | |
|---|---|---|---|
| 3,022,500 | 2/1962 | Stupar | 340—347 |
| 3,071,324 | 1/1963 | Schroeder et al. | 340—347 |
| 3,180,976 | 4/1965 | Robinson | 340—347 |

MALCOLM A. MORRISON, *Primary Examiner.*

J. F. MILLER, *Assistant Examiner.*